US010291861B2

(12) United States Patent
Djakovic et al.

(10) Patent No.: US 10,291,861 B2
(45) Date of Patent: May 14, 2019

(54) PRIVACY DEVICE AND METHOD FOR USE WITH NETWORK ENABLED CAMERAS

(71) Applicant: iDevices, LLC, Avon, CT (US)

(72) Inventors: Vladan Djakovic, San Francisco, CA (US); Shawn Monteith, Burlington, CT (US); Christopher J. Allen, Sr., West Hartford, CT (US); Paul Brantner, Conifer, CO (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/832,238

(22) Filed: Dec. 5, 2017

(65) Prior Publication Data

US 2018/0160020 A1    Jun. 7, 2018

Related U.S. Application Data

(60) Provisional application No. 62/497,834, filed on Dec. 5, 2016.

(51) Int. Cl.
*H04N 5/238* (2006.01)
*H04N 5/225* (2006.01)
(Continued)

(52) U.S. Cl.
CPC ........... *H04N 5/238* (2013.01); *H04N 5/2254* (2013.01); *H04N 5/2351* (2013.01);
(Continued)

(58) Field of Classification Search
CPC .. H04N 5/238; H04N 5/2254; H04N 5/23206; H04N 5/23216; H04N 5/235
See application file for complete search history.

(56) References Cited

U.S. PATENT DOCUMENTS

D761,264 S *    7/2016   Terry ........................... D14/440
2005/0168617 A1   8/2005   Timm et al.
(Continued)

FOREIGN PATENT DOCUMENTS

WO    2013144966 A1    10/2013

OTHER PUBLICATIONS

International Search Report and Written Opinion for International Patent Application No. PCT/US2017/064730 dated Mar. 7, 2018. 13 pages.

*Primary Examiner* — Nelson D. Hernández Hernández
(74) *Attorney, Agent, or Firm* — Leason Ellis LLP

(57) ABSTRACT

The invention disclosed herein concerns a privacy enhancing device for use with IP cameras and related methods. The privacy device includes an adjustable light filter and is configured to be placed over the lens of an IP camera such that the image captured by the IP camera passes through the filter. The transparency of the light filter is controlled using a control module in response to user inputs received using an on-board user interface so as to provide varying levels of privacy ranging from an opaque state and a transparent state. Inputs that serve to facilitate and enhance operation of the device can also be received from other input sources such as connected computing devices. For security, the control path defined by the control module and the on-board user input device can be isolated from other more sophisticated control devices that can be prone to hacking and remote control.

23 Claims, 9 Drawing Sheets

(51) Int. Cl.
*H04N 5/232* (2006.01)
*H04N 5/235* (2006.01)
*H04N 7/18* (2006.01)
*G02F 1/133* (2006.01)
*G02F 1/1334* (2006.01)

(52) U.S. Cl.
CPC .......... *H04N 5/23216* (2013.01); *H04N 7/18* (2013.01); *G02F 1/1334* (2013.01); *G02F 1/13306* (2013.01); *H04N 5/23206* (2013.01)

(56) References Cited

U.S. PATENT DOCUMENTS

| | | |
|---|---|---|
| 2008/0304819 A1 | 12/2008 | Tolbert |
| 2010/0165169 A1 | 7/2010 | Bilbrey |
| 2011/0058255 A1* | 3/2011 | Weiss .................. H04M 1/0264 359/511 |
| 2011/0076005 A1* | 3/2011 | Guo ........................ G03B 9/08 396/457 |
| 2012/0218450 A1 | 8/2012 | Pavithran et al. |
| 2014/0267874 A1 | 9/2014 | Ratcliff et al. |
| 2014/0313404 A1 | 10/2014 | Miao |
| 2015/0236743 A1* | 8/2015 | Kennedy .............. H04B 1/3888 455/575.8 |
| 2016/0082897 A1* | 3/2016 | Mouser ................ H04N 5/2257 348/148 |
| 2016/0105598 A1* | 4/2016 | Zeira .................. H04N 5/23203 348/143 |
| 2016/0147091 A1* | 5/2016 | Christmann ........ H01L 27/1446 345/207 |
| 2018/0123631 A1* | 5/2018 | Hessabi ................ H04B 1/3888 |
| 2018/0124899 A1* | 5/2018 | Robinson ................ E04D 13/03 |

* cited by examiner

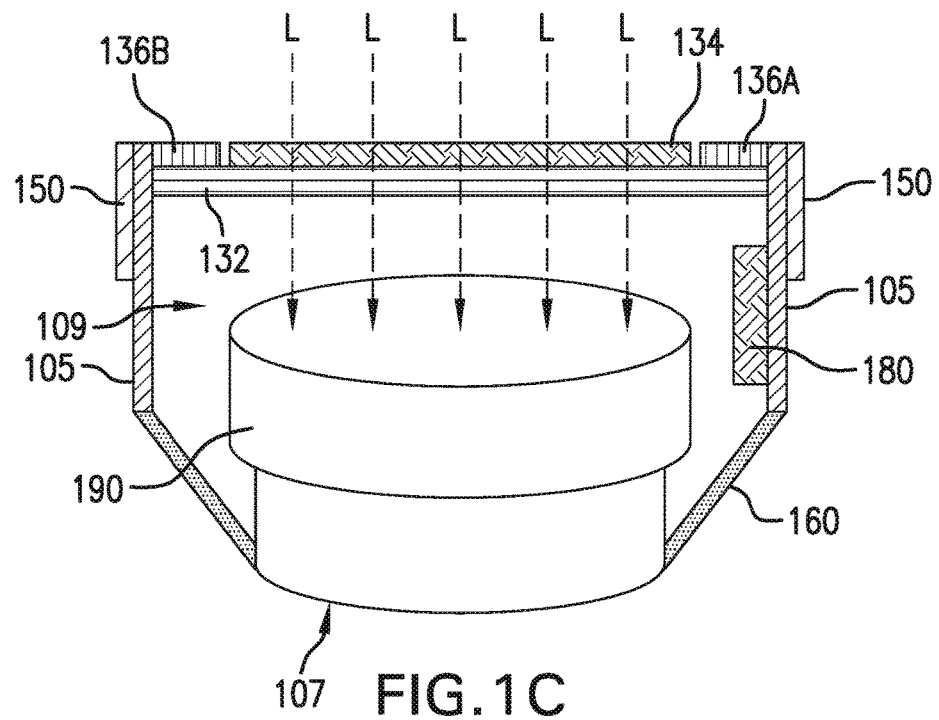
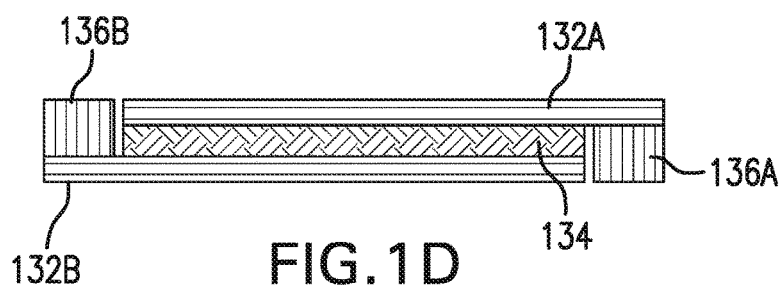

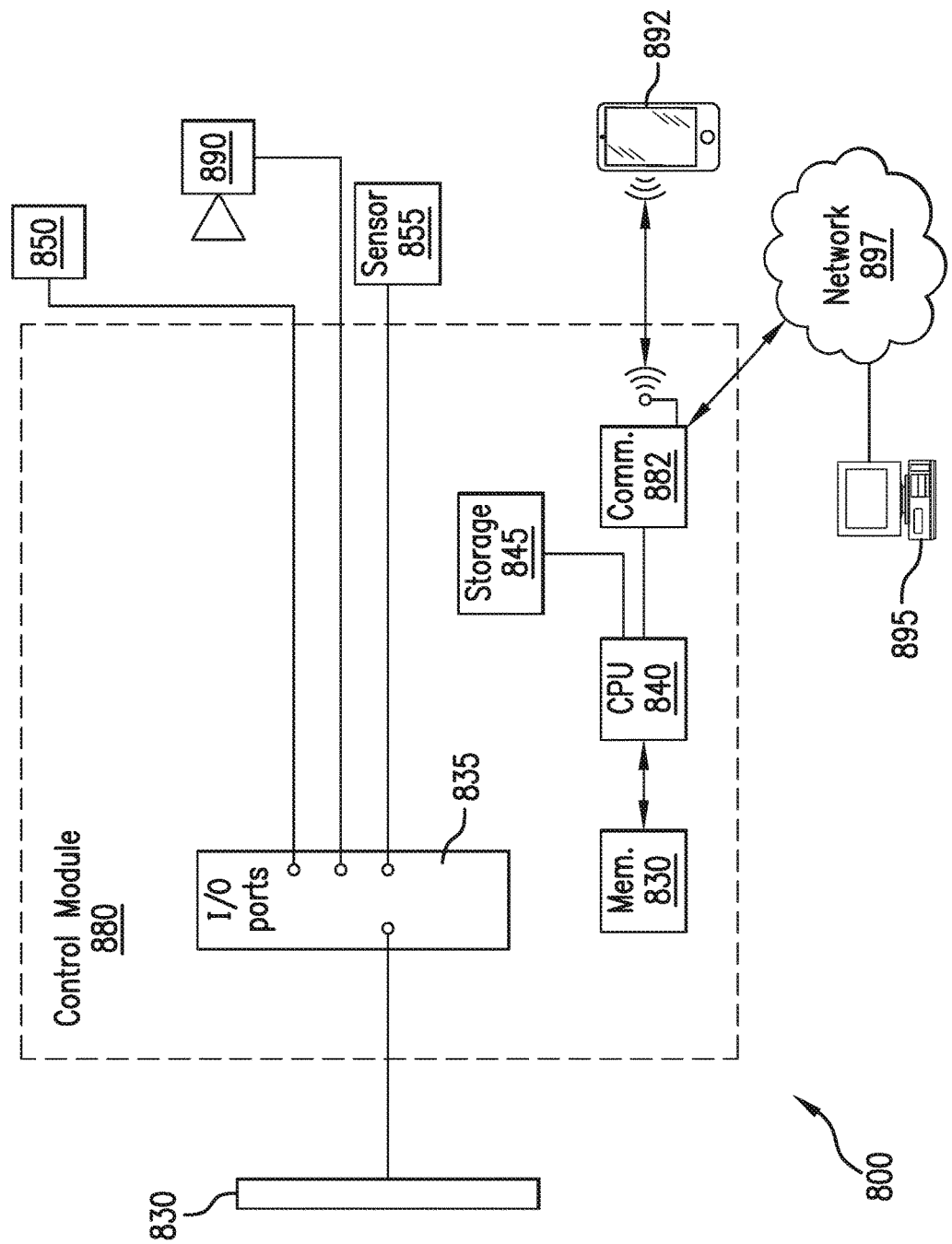

PRIVACY DEVICE AND METHOD FOR USE WITH NETWORK ENABLED CAMERAS

CROSS-REFERENCE TO RELATED APPLICATIONS

The present application is based on and claims priority to U.S. Provisional Patent Application No. 62/497,834 to Allen et al., filed on Dec. 5, 2016 and entitled ELECTRONICALLY CONTROLLED PRIVACY SYSTEM FOR AN IP BASED CAMERA SYSTEM, the contents of which is hereby incorporated by reference as if set forth expressly in its entirety herein.

FIELD OF THE INVENTION

The present invention relates to network enabled cameras, and in particular to adjustable light filter systems for use with network cameras to enhance user privacy.

BACKGROUND

The proliferation of network enabled cameras, such as "IP" (Internet Protocol) cameras, which are commonly used for a variety of home or business monitoring applications, has been accompanied by an increase in privacy concerns and security risks. IP cameras provide high quality live and recorded streaming video over networks like the Internet such that the recorded content can be viewed and monitored by end users at local or remote locations.

Unfortunately, there are deep-rooted concerns that the content recorded and distributed by IP cameras can be viewed by unintended parties, including hackers that can "hijack" cameras to spy on end users. Hijacking can, for example, involve intercepting the video feed being transmitted over the internet, as well as hacking into and gaining control over the IP camera itself, for instance, turning the camera on and recording without the owner's knowledge. Other types of digital cameras that are network enabled or indirectly connected to the internet via a computing device, such as smartphone cameras and web-cameras used with personal computers, present similar security risks. The term "IP camera," as used herein, is intended to include various types of digital video or still cameras that can be directly or indirectly connected to a network for the purpose of capturing imagery for recording or transmission over the network.

For at least the foregoing security reasons end-users have resorted to using basic anti-surveillance solutions to protect their privacy. These solutions are typically basic mechanical devices such as stickers, covers, and plastic slides, all of which are designed to cover up the camera lens and are un-hackable. These rudimentary solutions for enhancing privacy, however, lack convenience and sophistication. For example, a user can easily forget to apply the cover over the lens when the camera is not in use. Furthermore, existing lens cover solutions provide only an unobscured lens state and an obscured lens state, without providing the ability to adjust the privacy level between these two extremes. Moreover, the act of applying a lens cover can also be inconvenient, particularly when a user desires to apply and remove the cover multiple times a day or from a remote location.

By way of further example, some users resort to disconnecting the IP camera when it is not in use. However, this solution can also be inconvenient, particularly when the camera's data connection is not readily accessible. Moreover, it can also be difficult to tell whether the IP camera is connected/disconnected or active/inactive from simply looking at the IP camera device.

It is with respect to these and other considerations that the disclosure made herein is presented.

SUMMARY

Technologies are presented herein in support of a systems and method for providing a privacy device that controls light entering a lens of an image pickup device.

According to a first aspect, a privacy device for selectively controlling properties of light entering a lens of an image pickup device is disclosed. The privacy device includes a body having a peripheral side-wall that surrounds a generally hollow interior volume and defines an open back of the body. The body also includes a mount adapted to attach the body to the image pickup device. The privacy device also includes a light filter that is supported by the body and defines a front side of the body that is opposite the open back. More specifically, the light filter comprises a transparent substrate that extends across the interior volume, and a smart film disposed on a surface of the substrate. In addition, the transparency level of the smart film is adjustable as a function of an electrical control signal applied to the smart film.

According to a further aspect, the privacy device can also include a first user interface for detecting a user input and generating an electrical input signal based on the user input and a control module that is electrically connected to the first user interface and the smart film. More specifically, the control module is configured to generate the control signal as a function of the input signal and thereby selectively controls the transparency of the smart film based on the user input.

According to another aspect, a method for selectively adjusting a privacy level during use of an image pickup device with a light-filtering privacy device is provided. The method includes the step of providing a privacy device comprising (a) a body having a peripheral side-wall surrounding a generally hollow interior volume and defining an open back of the body, and a mount adapted to attach the body to the IP camera and (b) a light filter supported by the body and defining a front side of the body opposite the open back-side of the body. In particular, the light filter includes a transparent substrate extending across the interior volume, and a smart film disposed on a surface of the substrate. Moreover, a transparency level of the smart film is adjustable as a function of an electrical control signal applied to the smart film. The provided privacy device also includes a first user interface for detecting a user input and generating an electrical input signal based on the user input, and a control module that is electrically connected to the first user interface and the smart film. More specifically, the control module is configured to generate the control signal as a function of the input signal and thereby selectively controls the transparency of the smart film based on the user input.

The method also includes the step of detecting, with the first user interface, a user input and generating an electrical input signal. In addition, the method includes the step of determining, with the control module, a target transparency level among a plurality of transparency levels based on the input signal. Furthermore, the method includes the step of generating, with the control module based on the target transparency level, a control signal that corresponds to the target transparency level and transitioning the light filter to the target transparency level by applying the control signal to the light filter with the control module.

According to yet another aspect, a privacy device for selectively controlling properties of light entering a lens of an IP camera is disclosed. The privacy device includes a body having a peripheral side-wall that surrounds a generally hollow interior volume and defines an open back of the body. The body also includes a mount adapted to attach the body to the image pickup device.

The privacy device also includes a light filter that is supported by the body and defines a front side of the body that is opposite the open back. More specifically, the light filter comprises a Polymer Dispersed Liquid Crystal (PDLC) smart film, wherein a transparency level of the smart film is adjustable between a plurality of transparency levels as a function of an electrical control signal. The light filter further comprises two conductive elements electrically connected to a control module and configured to apply the control signal across at least a portion of the smart film.

In addition, the privacy device includes a first user interface having a touch-sensitive surface provided on an exterior surface of the peripheral sidewall, and a control input circuit that is electrically connected to the touch-sensitive surface and configured to detect a user touch of the touch-sensitive surface and generate an input signal as a function of the user touch.

The privacy device also includes a control module that is electrically connected to the first user interface and the smart film and that is configured to generate the control signal as a function of the input signal and thereby selectively controls the transparency of the smart film based on the user input. More specifically, the control module includes a microcontroller electrically connected to the control input circuit and that is configured to determine a target transparency level among the plurality of transparency levels based on the input signal received from the control input circuit. In addition, the control module includes a film control circuit that is electrically connected to the microcontroller and that is configured to generate the control signal based on the determined target transparency level. In particular, the generated control signal has a voltage level that causes the smart film to transition to the target transparency level when applied across the smart film using the two conductive elements.

These and other aspects, features, and advantages can be appreciated from the accompanying description of certain embodiments of the invention and the accompanying drawing figures and claims.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1C is a cut-away side view of the privacy device of FIG. 1A and an IP camera according to one or more embodiments of the invention;

FIG. 1D is a schematic diagram of an exemplary light filter according to one or more embodiments of the invention;

FIG. 8 is a block diagram illustrating an exemplary configuration of a privacy device according to one or more embodiments of the invention.

DETAILED DESCRIPTION OF CERTAIN EMBODIMENTS OF THE INVENTION

Figure 1A:
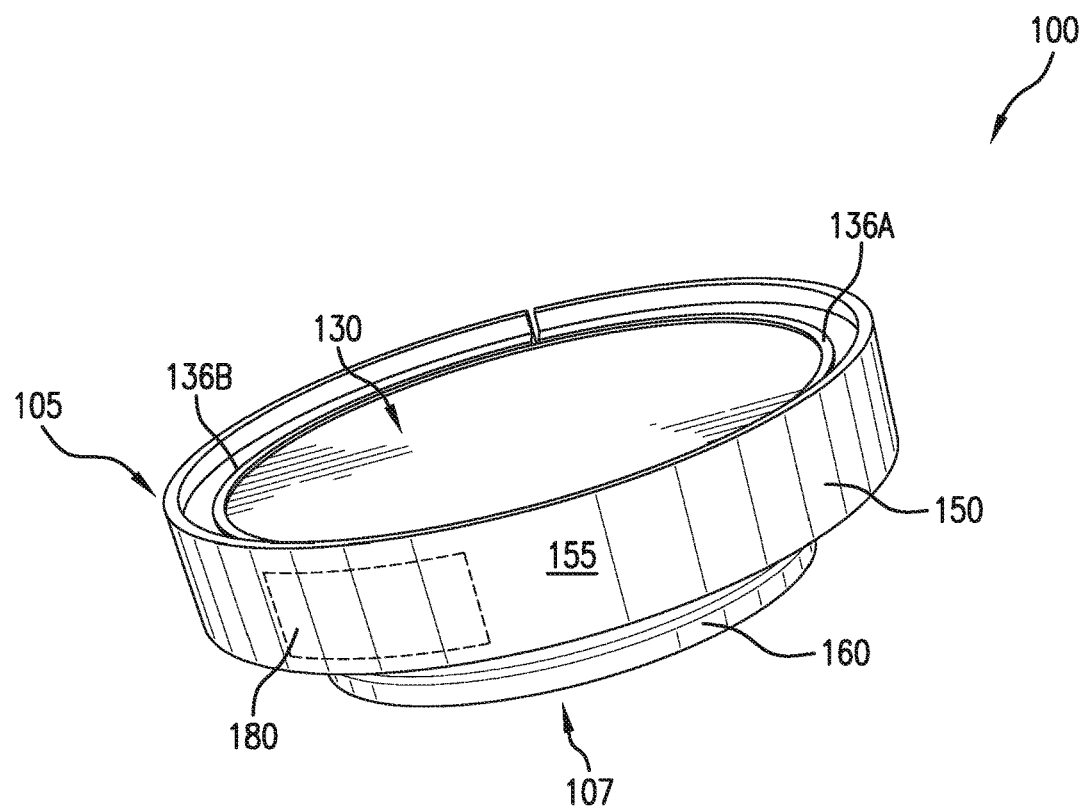
FIG. 1A is a perspective view of an exemplary configuration of a privacy device according to one or more embodiments of the invention.

By way of overview and introduction, the invention disclosed herein concerns a light filtering device and related methods for use with IP cameras to enhance user privacy. In particular, the privacy device includes an adjustable light filter that can be attached to or placed over the lens of an IP camera such that light must pass through the light filter before it can be captured by the IP camera. According to a salient aspect, the optical properties of the light filter can be electrically controlled using a control module. Typically, the control module is configured to adjust the transparency of the light filter in response to manual user interaction received via a user interface device provided on the exterior of the privacy device. In addition or alternatively, inputs that serve to control the operation of the privacy device can be received from other input sources that are in communication with the control module, including for example, other computing devices, the IP camera and the like.

Preferably, the control module is configured to transition the light filter between at least a transparent state and an opaque state. In addition or alternatively, the transparency of the filter can be set to any number of intermediate transparency levels falling between the aforementioned transparent and opaque states. Accordingly, by controllably adjusting the light-transmission properties of the light filter, the privacy device can provide different levels of privacy to suit the user's needs and maintain a selected privacy state until a subsequent user input is received.

The term "transparent" is intended to refer to a state in which electromagnetic radiation suitable for recording imagery by the IP camera is transmitted through the filter without substantial interference. The term "opaque" is intended to refer to a non-transparent state in which the IP camera is unable to record discernable images. Accordingly, the opaque state of the light filter is not required to completely reflect, scatter or absorb radiation and can obfuscate imagery recorded by the IP Camera through, for example, diffuse reflectance or transmission or absorption or any combination of the foregoing.

Although embodiments of the privacy device described herein are configured to include an optical "light filter" for filtering visible light, the privacy device can be adapted to selectively filter other wavelengths of electromagnetic radiation that can be captured using IP Cameras including, for example, infra-red radiation. Similarly, it should be understood that various different types of transmission, reflectance or absorption properties of the light filter can be adjusted to achieve the desired privacy levels. Accordingly, the term "light filter" is not meant to be limiting and other approaches to obscuring the imagery captured by the IP camera can be employed depending on the application.

According to a further salient aspect, the control module and the user interface can be configured to define a control path for controlling the privacy device that is independent and functionally isolated from other possible control paths that can operate on control inputs received from other sources. Additional or alternative sources of control inputs can include, for example, the IP camera, other computing devices in communication with the control module and a variety of sensors and devices capable of collecting information relating to the operation of the privacy device. As a result of the discrete control path, the manual user-controlled operation of the privacy device cannot be hacked or overridden from a remote computer that might gain access to the IP camera, the privacy device itself, or any computing devices in data communication therewith. In addition, the control module can also be configured such that inputs received via the manual input control path override control inputs received via secondary control paths.

FIG. 1A is a perspective view of an exemplary configuration of a privacy device 100 according to one or more embodiments of the invention. The privacy device 100 comprises a body 105 defined by one or more sidewalls. The body encompasses a generally hollow internal cavity 109 shown in FIG. 3 and has an open bottom 107.

The body 105 also supports a light filter 130 at a side opposite the open bottom 107. The light filter extends transversely across the internal cavity and, thus, encloses the internal cavity near the front side of the privacy device (toward the top in FIG. 1A). As shown, the light filter can have a generally circular shape that is similar to the shape of conventional camera lenses and conventional camera lens attachments.

Preferably, the privacy device 100 also includes a user interface 150, which serves to facilitate the capture of manual inputs from the user including instructions to transition the privacy device to a particular privacy-state or other commands and settings that facilitate operation of the privacy device. The user interface can comprise one or more active or passive input device(s) such as switch(es), button (s), key(s), touch-sensitive input devices, microphones, sensors and the like.

In the particular implementation shown in FIG. 1A, the user interface 150 comprises a touch-sensitive surface 155 provided on the exterior surface of the body 105. In addition, the touch-sensitive surface 155 can be operatively connected to circuitry (not shown) configured to detect changes in electrical properties (e.g., resistance, capacitance and the like) that occur when a user touches the surface 155.

The privacy device 100 further comprises a control module 180 (shown in dashed lines) configured to receive control inputs received from one or more input sources and transition the light filter 130 to a prescribed privacy state based on the received inputs, as further described herein. In particular, the control module can comprise electronic components and circuitry for detecting changes in the electrical properties of the touch-sensitive surface 155 of the user interface 150 caused by a user's touch, interpret the detected user input and supply a control signal to the light filter 130 that serves to adjust the transparency of the light filter as a function of the received user input.

As shown, the control module is housed within the body 105 and is operatively connected to the user interface 150 and the light filter 130 (connections not shown). The various devices and circuitry that comprise the control module 180 can be arranged as a unit or as separate interconnected components and circuits. Moreover, the control module's components can be located on-board the privacy device or one or more of the components can be physically separate from the privacy device and electrically connected thereto.

As noted, the light filter 130 of the privacy device 100 is intended to be positioned relative to the IP camera's lens (190 in FIG. 1C) such that it occupies the field of view of the lens and ambient light passes through the light filter 130 and the internal cavity 109 before reaching the lens. Accordingly, the body 105 can also incorporate a mount 160 for attaching the privacy device to the body of the IP camera or its lens. In the exemplary embodiment shown in FIGS. 1A and 1C, the mount 160 comprises a "cuff" encircling the opening provided at the bottom end 107.

In some implementations, the mount 160 can be integral to the body 105 or attached thereto. Furthermore, the mount can be configured to permanently secure the privacy device 100 into position or, in addition or alternatively, provide a temporary securement. Moreover, the mount can rigidly couple the body to the IP camera or, in addition or alternatively, allow the privacy device to be moveable relative to the IP camera. For example and without limitation, the mount 160 can comprise an adhesive cuff configured to form a bond between the body 105 and the IP camera. By way of further example, the mount can comprise one or more fasteners configured to matingly engage complementary fasteners provided on the IP camera body. In addition or alternatively, the mount can be configured to attach the body to the IP camera by way of a friction or interference fit. For example, the mount can comprise an elastic cuff designed to be stretched around the periphery of the camera lens body and hold the privacy device in position relative to the lens. Ultimately, the exemplary mounting configurations serve to provide a privacy device 100 that can be used with existing camera devices of various sizes, shapes and types. However, it should be understood that, in addition or alternatively, the privacy device can be permanently fused to or integrally formed with an IP camera (or lens body) to provide an integrated camera and privacy filter system.

It should also be understood that the privacy device 100 and its components can be sized, shaped and arranged to accommodate its intended application. For instance, the body 105 and light filter 130 can be sized such that it can be used with IP cameras having different sizes, shapes and lens configurations (e.g., an IP camera with a flush mounted lens or a protruding lens, wide-angle lenses, narrow angle lenses, and the like). Further, the body 105 can be designed so that the internal cavity 109 is deep in order to accommodate the body of an IP camera lens 190 at least partially within the internal cavity, as shown in FIG. 1C. In addition or alternatively, the body 105 can define a relatively wide and shallow internal cavity 109, for use used with IP cameras having recessed or flush-mounted lenses, without limiting the field of view of the IP camera.

Figure 1B:
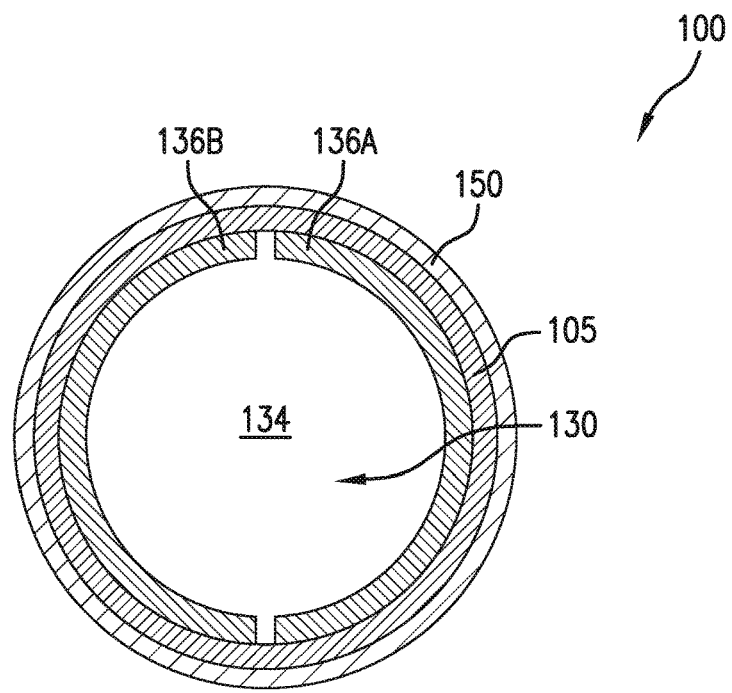
FIG. 1B is a top-plan view of the privacy device of FIG. 1A according to one or more embodiments of the invention.

FIGS. 1B and 1C provide, respectively, a simplified top plan view and a cut-away side view of the privacy device 100. FIGS. 1B and 1C illustrate an exemplary configuration of the light filter 130 in greater detail. As shown, the light filter 130 comprises a "smart film" 134. The smart film 134 is the component of the light filter 130 having optical properties that are adjusted using the control module. The smart film can be supported by one or more transparent substrates such as a glass or plastic substrate.

By way of example and without limitation, the smart film 134 can comprise a layer of Polymer Dispersed Liquid Crystal (PDLC) film disposed on a substrate 132. In addition, the light filter 130 further comprises one or more conductive elements, 136A and 136B that are connected to the control module 180 (not shown in FIG. 1B) by wire leads (not shown). The conductive elements are spaced apart from one another and are arranged to apply a voltage across at least a portion of the PDLC layer, as would be understood by those in the art. As shown in FIGS. 1A-1C, the two half-ring shaped conductive elements 136A and 136B are positioned about respective peripheral margins of the smart film 132 and are spaced apart from one another. In addition the conductive elements can be spaced apart from the edge of the PDLC smart film 132. By way of further example, as shown in FIG. 1D, the PDLC layer 134 can be sandwiched between two clear plastic substrate layers 132A and 132B, and the conductive elements 136A and 136B can be adhered to a respective one of the two substrate layers.

The PDLC smart film layer, in effect, acts as the dielectric of a capacitor between the two conductive elements 136A and 136B. Application of an alternating current (AC) or direct current (DC) voltage across the PDLC smart film 132 causes the transparency of the film to change as a function of the applied voltage. More specifically, when no voltage is applied across the smart film, the liquid crystal molecules of the PDLC smart film are disordered causing the smart film to have an opaque, "milky white" appearance. When a prescribed "high" voltage is applied, say a 110V AC or DC control signal, the electric field formed across the film aligns the liquid crystal molecules allowing light to pass through the film without interference (e.g., shown as the dashed arrows "L" in FIG. 1C). While the opaque state might still be considered translucent in that it allows some light to pass through the film, the smart film effectively diffuses enough light to prevent the IP camera from capturing a useable image. In some configurations, intermediate transparency levels between the opaque and transparent state can also be achieved by applying respective voltages across the PDLC smart film that fall between the high voltage level (e.g., 110V AC or DC) and low voltage level (e.g., 0V).

Thus, placing the smart film 132 over the camera lens and selectively applying a control signal to the smart film can control the transparency of the smart film and, thus, the level of privacy. In accordance with a salient aspect, the "milky-white" appearance of the PDLC film that varies as a function of its transparency also provides visual feedback to the user as to the degree of transparency/opacity, thereby allowing the user to see whether the camera is obscured or to what degree.

Although the exemplary light filter 100 includes an electrically operated light filter 130 and user interface 150, in addition or alternatively, the privacy device 100 can incorporate a mechanical switch that forces the PDLC film into a particular transparency state and is unconditional and impossible to override. A mechanical or electro-mechanical switch can further prevent hackers from controlling the invention via remote means and/or by software.

By way of example and without limitation, the override switch can comprise a mechanical switch such as an "air gap" switch that disconnects the PDLC film from the power source, making it unconditionally opaque. Alternative manual override switch configurations can be implemented to disable or override non-manual controls, force the device to a particular state (e.g., the opaque state or the last manually-selected state, whether transparent, opaque or otherwise) and maintain the state.

Figure 2:
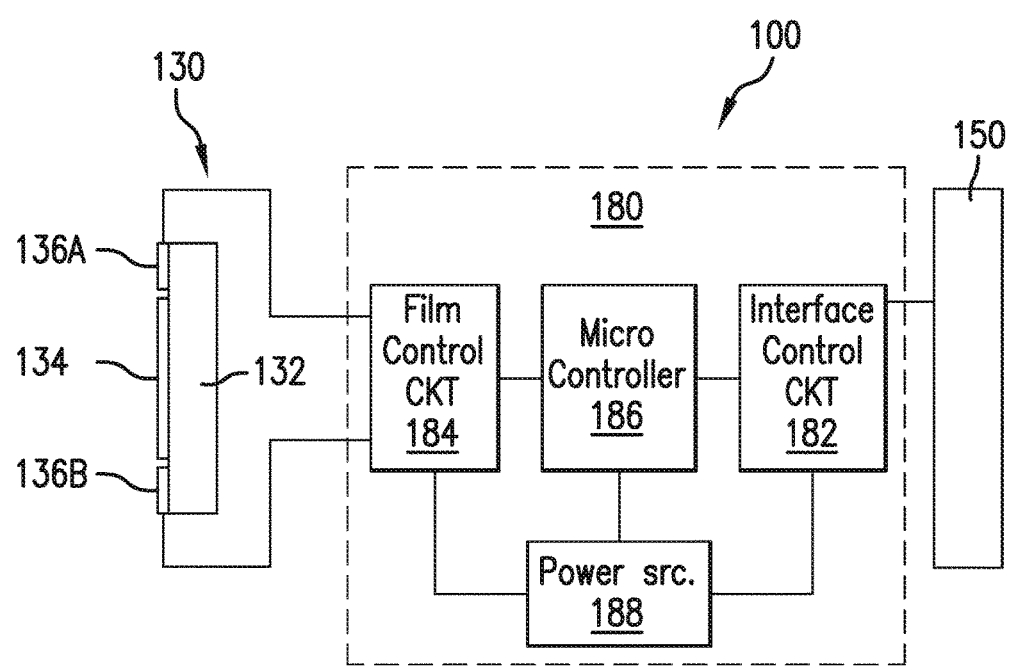
FIG. 2 is a block diagram illustrating an exemplary configuration of components for controlling operation of the privacy device of FIG. 1A according to one or more embodiments of the invention.

FIG. 2 is a simplified block diagram illustrating the touch-sensitive user interface 150, the light filter 130, the control module 180 and connections there-between. FIG. 2 also depicts an exemplary configuration of the control module 180 in greater detail. As shown, the control module comprises an interface control circuit 182, a film control circuit 184 and a programmable microcontroller 186.

The interface control circuit 182 is configured to sense touch inputs received at the user interface 150 and provide the microcontroller 186 with a control input signal that is suitable for processing. The microcontroller is programmed to process the received control input for the purpose of determining the target privacy state of the light filter in view of prescribed operational settings and instructions, and provide an output to the film control circuit accordingly. In turn, the film control circuit 184 is configured to apply a control signal to the light filter 130 that sets the transparency of the light filter as a function of the input(s) received from the microcontroller. As noted, the control circuit 184 can apply the control signal to the smart film 132 via the conductive elements 136A or 136B. Exemplary configurations of the interface control circuit 182, the film control circuit 184 and the microcontroller 186 are further described in connection with FIGS. 3-6 and with continued reference to FIGS. 1A-2.

Preferably, a power supply 188 is also connected to the control module 180 and any other components that might require power for operation, such as the user interface 150 and the light filter 130. The power supply 188 can be any style of energy storage device or energy source as would be understood by those in the art. For example and without limitation, the power supply can be one or more energy storage devices, such as a lithium-ion battery that is housed within the body 105 of the privacy device. In addition or alternatively, the power supply can be an external source that is connected to the control module by a wired connection. For example, the external power supply can be the battery of the IP camera or, by way of further example, a 110V mains power supply that the privacy device 100 is plugged directly into.

The different illustrative embodiments of the privacy device can be implemented in a system including components in addition to or in place of those illustrated for control circuit 180. Other components shown as being part of the control circuit 180 can be varied from the illustrative examples shown. The different embodiments can be implemented using any hardware device or system capable of running program code. In addition or alternatively, aspects of the control circuit 180 can take the form of a hardware unit that has circuits that are manufactured or configured for a particular use. This type of hardware can perform operations without needing program code to be loaded into a memory from a computer readable storage device to be configured to perform the operations. For example, the control circuit 180 can take the form of one or more of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software programs can be omitted because the processes for the different embodiments are implemented in a hardware unit. Furthermore, certain functional blocks of the control module 180, such as the interface control circuit 182 or the film control circuit 184, can be combined with or integrated into other components of the privacy device 100, such as the user interface 150 and the light filter 130, respectively.

Figure 3:
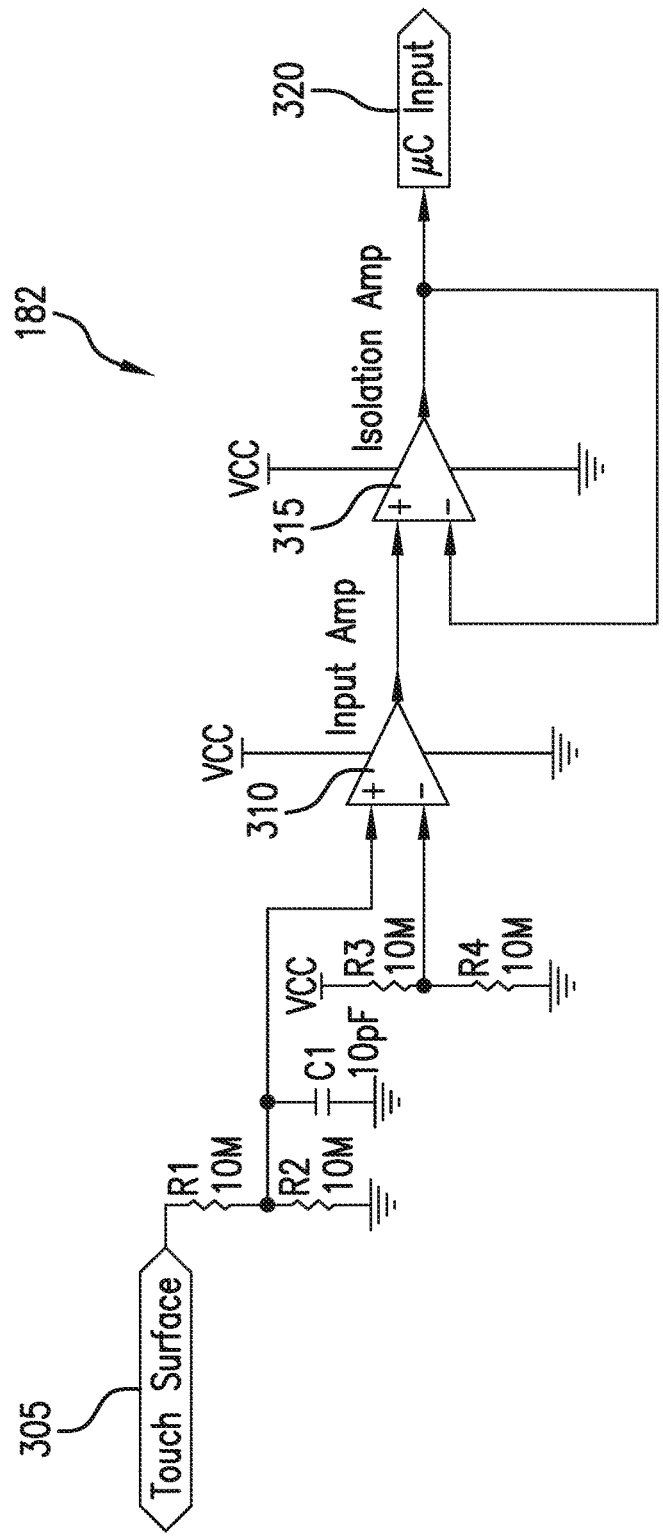
FIG. 3 is a circuit diagram illustrating an exemplary circuit for detecting user inputs of a touch-sensitive user interface according to one or more embodiments of the invention.

FIG. 3 is a circuit diagram depicting an exemplary configuration of the interface control circuit 182 in accordance with one or more embodiments of the invention. Generally, the interface control circuit is configured to sense the user touch of the touch-sensitive user interface 150 and provide a one (1) bit input that is representative of the detected user touch to the microcontroller 186 via node 420.

More specifically, as shown in FIG. 3, circuit 182 receives an analog electric signal at the input node 305 from the touch-sensitive surface 155 of the user interface 150. Resistors R1 and R2 define a voltage divider designed to protect against electrostatic discharge that might be received at input node 305. Capacitor C1 is provided to control the sensitivity of the touch-detection function performed by the interface control circuit. The particular value of C1 can be adjusted for compatibility with the touch-sensitive surface 155 and to optimize the touch duration necessary for the interface control circuit 182 to detect a user touch and generate an electrical signal that is discernable by the microcontroller. An input amplifier 410 is configured to compare the input voltage, as adjusted by R1/R2 and C1, to a reference voltage defined by a voltage divider comprising resistors R3 and R4. Based on the comparison, the input amplifier generates a corresponding output, for instance, a voltage high (VCC) if a touch is registered, or a voltage low (GND) if a touch is not registered. As would be understood, an isolation amplifier 315 can be provided to condition the output of the input amplifier 310 for protection of the microcontroller 186.

Figure 4:
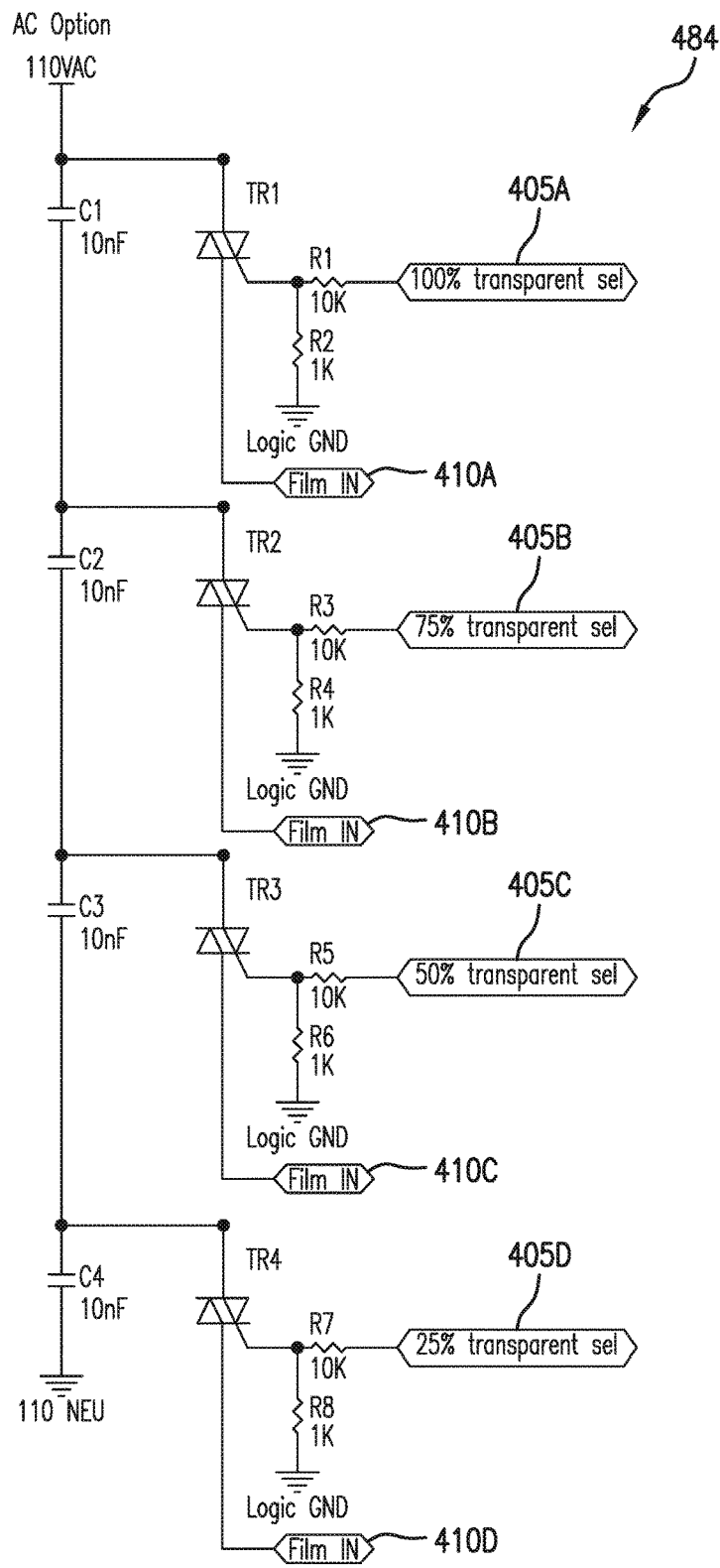
FIG. 4 is a circuit diagram illustrating an exemplary AC powered circuit for controlling the transparency level of the privacy device of FIG. 1A according to one or more embodiments of the invention.

FIG. 4 is a circuit diagram illustrating an exemplary film control circuit 484 that is configured to operate using 110 VAC mains power supply. In other words, the exemplary circuit of FIG. 4 can be used to control the transparency of the smart film 130 in configurations where the privacy device 100 is directly fed with 110 VAC mains power, rather than a DC power source.

In particular, capacitors C1 through C4 comprise a reactive voltage divider. The configuration shown in FIG. 4 allows for an even voltage split of 100%, 75%, 50%, and 25% of the 110V maximum voltage. Alternate capacitor values can be chosen to provide other voltages to the smart film for other translucency settings. The capacitor values can also increase proportionally in implementations where more operating current is required. The nodes "Film IN" are intended to refer to the connection between the circuit and the voltage high side of the film. In other words, the "Film In" outputs 410A-410B from the circuit 484 are connected to a first conductive element among the two spaced apart conductive elements (e.g., element 136A shown in FIG. 2) and apply the voltage levels, 100%, 75%, 50%, and 25%, respectively, to one side of the film 132. The "LOW side of the film, namely, the second conductive ring among the two spaced apart conductive rings (e.g., element 136B shown in FIG. 2) is connected to an AC Neutral (e.g., logic ground (GND)).

TR1 through TR4 represent TRIACS or silicon controlled rectifiers, which are "sensitive" in that only a small logic voltage/current is needed to trigger them, and configured to be operated directly by n number of individual inputs received from the microprocessor via respective inputs 405A-405D. When activated, TR1-TR4 provide a respective level of AC voltage to the smart film 130 via "Film IN" nodes 410A-410D, respectively. Only one of the n number of inputs (e.g., 405A to 405D) are operated at a time and, depending on which one is operated, a respective level of transparency is achieved. Furthermore, in implementations in which the natural state of the PDLC smart film 132 is opaque, the absence of a control signal output by the film control circuit 484 can result in the smart film remaining opaque.

The actual voltages seen by the smart film 132 can be controlled via P-type/N-type transistor pairs (not shown). These transistor pairs control the input at 405, not the voltage seen by the firm from 410. These transistors may be operated directly by outputs from the microprocessor 186 via four each ports (such as "100% transparency select" input 405A) or via a multiplexer to allow the port numbers to be reduced to just two. TRIAC/SCR control can be steady state (ON/OFF) and no pulse width modulation is required to provide sine wave voltages to the smart film 132.

Figure 5:
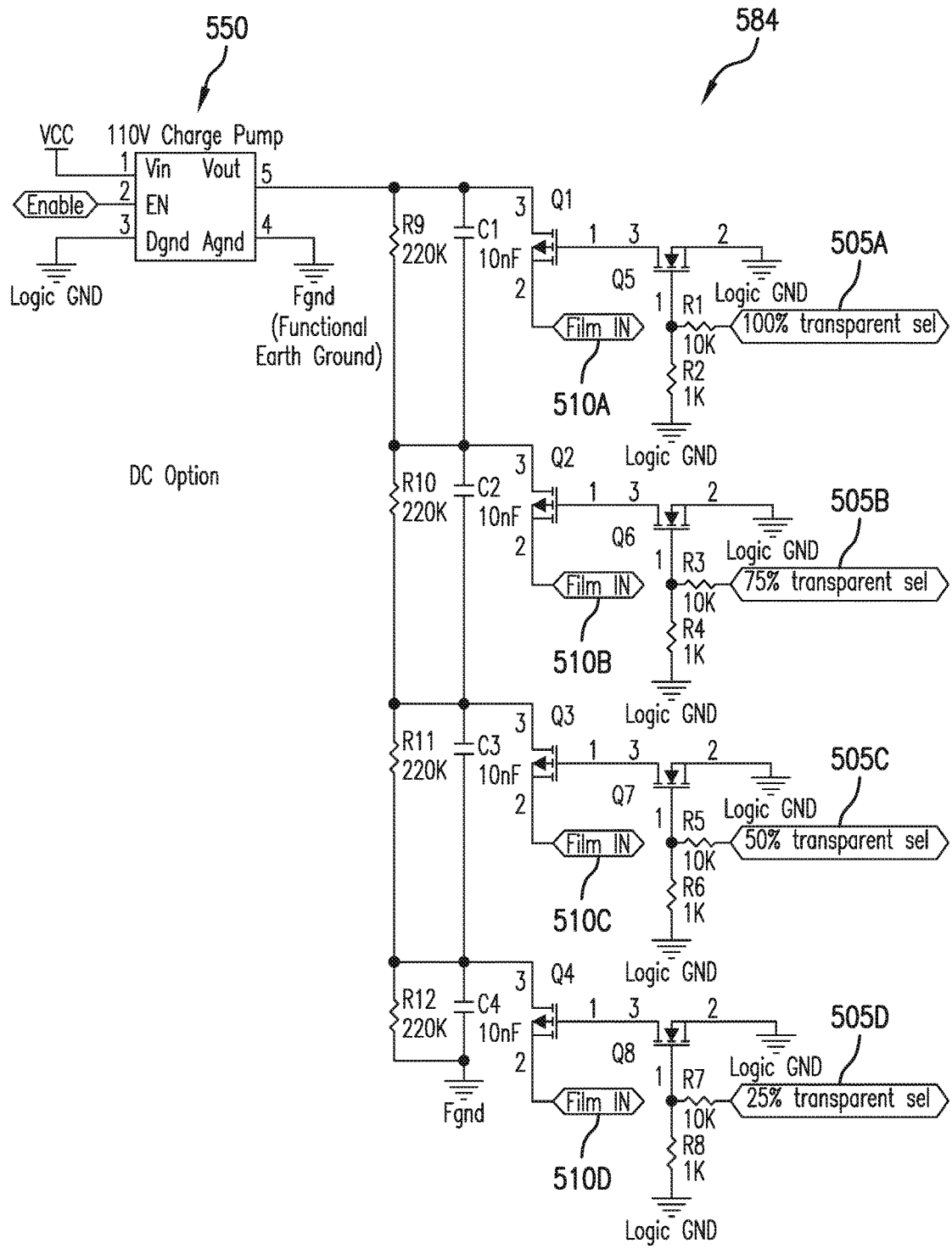
FIG. 5 is a circuit diagram illustrating an exemplary DC powered circuit for controlling the transparency level of the privacy device of FIG. 1A according to one or more embodiments of the invention.

FIG. 5 is a circuit diagram illustrating an exemplary film control circuit 584 designed for configurations in which the power source 188 supplies DC power to the control module 180. As would be understood by those in the art, the charge pump circuit 550 is configured to, in response to the "enable" input that turns the pump on and off, step-up or boost the DC input power ("VCC") to a level that is suitable for use in activating the smart film 130, for instance, a 110V DC output at node Vout of the charge pump. The exemplary circuit 584 can operate using any DC input power value, however, the internal configuration of the charge pump/boost circuit 550 is preferably defined according to the particular DC input power level and required DC output power level.

As shown, resistors R9 through R12 and associated capacitors C1 through C4, respectively, define a voltage divider that splits the voltage output by the charge pump, Vout, into four levels relative to functional earth ground, Fgnd. For instance, the voltage divider of circuit 584 allows for an even voltage split of 100%, 75%, 50%, and 25% of Vout to be provided at respective nodes "Film IN" 510A-510D. Alternate resistor values can be chosen to achieve voltage level divisions of different magnitudes and, thus, alternate transparency settings. In addition, a voltage divider comprising more or fewer R/C pairs can be implemented to achieve more or fewer voltage divisions.

Similar to the circuit described in relation to FIG. 4, the "Film IN" nodes 510A-510D shown in FIG. 5 can be connected to the "high" side of the smart film 130 via a first conductive element 136A. In addition, the "low" side of the smart film 130 can be connected to Logic Ground (GND) along with the second conductive element 136B.

The voltages seen by the privacy film are controlled via P-type/N-type FET transistor pairs such as pairs Q1/Q5, Q2/Q6, Q3/Q7, Q4/Q8 configured to selectively provide voltage outputs to the film over one of lines 510 to achieve transparency levels 100%, 75%, 50%, and 25%, respectively. Control of these transistor pairs can be effectuated directly by inputs received from the microprocessor via respective inputs 505A-505D. Alternatively, the transistors can be controlled via a multiplexer to allow the microcontroller port numbers to be reduced to just two. Moreover, in view of the DC voltage output by the charge pump, pulse width modulation or timed port ON/OFF functionality can also be incorporated so as to provide square wave voltages to the smart film 130 for activating the smart film. Furthermore, in implementations in which the natural state of the PDLC smart film 132 is opaque, the absence of a control signal output by the film control circuit 584 can result in the smart film remaining opaque.

Figure 6:
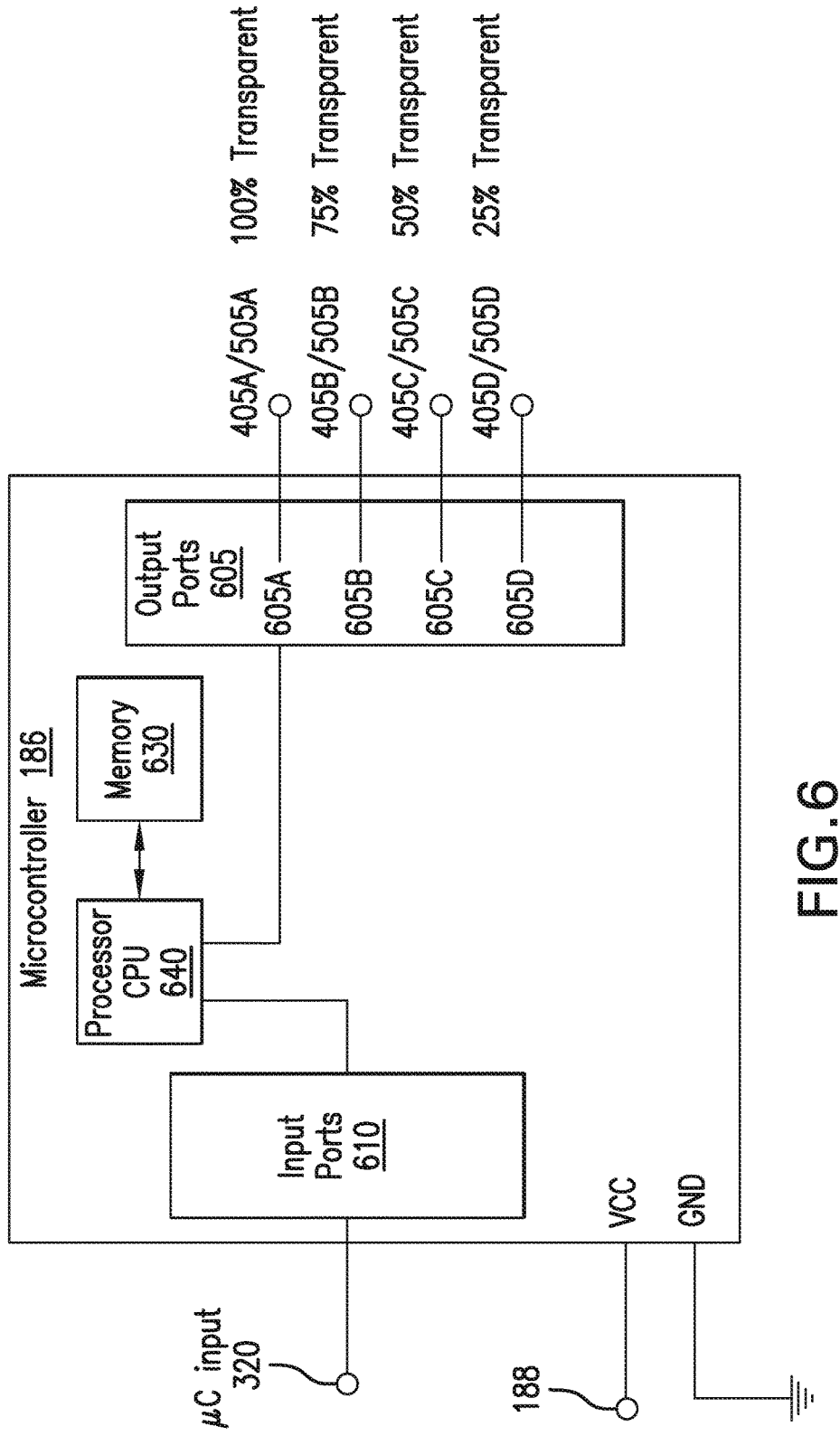
FIG. 6 is block diagram illustrating an exemplary microcontroller system for controlling operation of the privacy device of FIG. 1A according to one or more embodiments of the invention.

FIG. 6 is a functional block diagram of the exemplary microcontroller 186. Any suitable microcontroller comprising one or more processors and peripheral components, as are well known in the art, is employable to receive and interpret analog or digital control input signals and generate analog or digital output signals suitable for controlling the light filter 130 in accordance with one or more of the disclosed embodiments. The various components of the microcontroller can be combined into a single integrated circuit or provided as discrete devices. As used herein, the term "signal" is intended encompass digital signals, analog signals or any combination of the foregoing.

As shown in FIG. 6, the microcontroller 186 can comprise a processor 640 along with memory 630 and programmable input/output peripherals. In particular, the microcontroller can be configured to receive control input signals via input port 610 and to output signals for controlling the light filter 130 via one or more output ports 605A-605D. In the exemplary embodiment shown in FIG. 3, the input received at input port 610 from the interface control circuit 182 can be a one bit signal signifying whether a user is touching a touch-sensitive surface 155 of the user interface 150. However, the number of input ports, output ports or I/O ports can vary depending on the implementation. For example, the microcontroller can include a plurality of input ports that correspond to one or more sources of control inputs. By way of further example, the microcontroller can receive a multi-bit digital input at port 610, say, a digital word representing a duration and a particular location of a user touch on the touch-sensitive surface 155 of the user interface 150. By way of further example, the microcontroller can be configured to receive an analog signal at port 610, wherein the magnitude of the signal is indicative of the duration of the user touch of the touch-sensitive surface 155. Such an approach would require an analog to digital converter so that the processor 640 can operate based on the signal, assuming a digital processor.

As shown in FIG. 6, the microcontroller 186 includes the processor 640 that is in operative communication with the input ports 610 and output ports 605A-605D. The processor 640 serves to execute software instructions that can be loaded into a non-transitory computer-readable storage medium (e.g., memory 630). Memory 630 can be implemented using, for example, a random access memory (RAM) or any other suitable volatile or non-volatile computer readable storage medium. The processor can be implemented using multiple processors, a multi-processor core, or some other type of processor. The memory is accessible by the processor, thereby enabling the processor to receive and execute instructions stored in the memory and/or in another storage medium. In particular, the instructions configure the processor to monitor the inputs received from the input control circuit 182, process the inputs and programmatically generate outputs for transitioning the light filter 130 as a function of the inputs.

Figure 7:
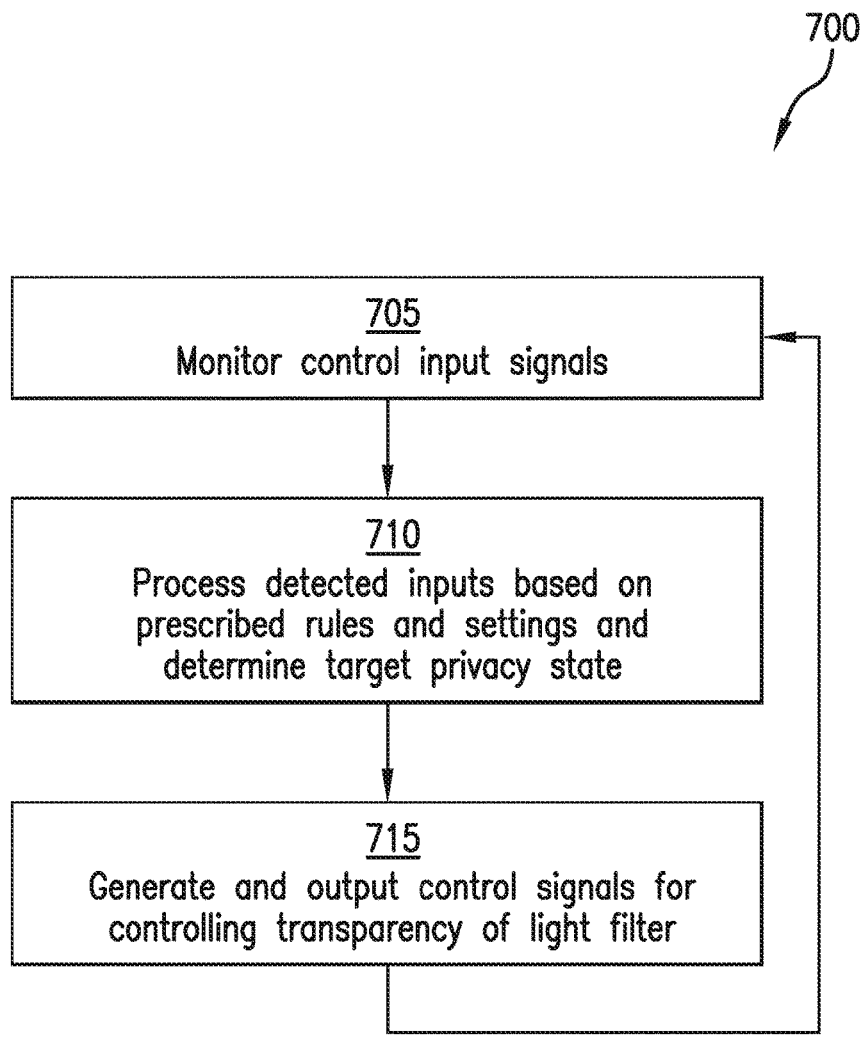
FIG. 7 is a flow diagram illustrating an exemplary routine for controlling operation of the privacy device of FIG. 1A according to one or more embodiments of the invention.

Turning now to FIG. 7, a flow diagram is provided showing a routine 700 that illustrates a broad aspect of a method for controlling the privacy state of the privacy device 100 in accordance with at least one embodiment disclosed herein. It should be appreciated that several of the logical operations described herein are implemented (1) as a sequence of computer implemented acts or program modules running on the processor 640 and/or (2) as interconnected machine logic circuits or circuit modules within the processor. The implementation is a matter of choice dependent on the requirements of the device (e.g., size, energy, consumption, performance, etc.). Accordingly, the logical operations described herein are referred to variously as operations, steps, structural devices, acts, or modules. As referenced above, various of these operations, steps, structural devices, acts, and modules can be implemented in software, in firmware, in special purpose digital logic, special purpose analog circuitry, and any combination thereof. It should also be appreciated that more or fewer operations can be performed than shown in the figures and described herein. These operations can also be performed in a different order than those described herein.

Routine 700 begins at step 705, in which the processor 640, which is configured by executing instructions therein, monitors one or more control input signals received by the microcontroller. For instance, the processor 640 can monitor input port 610, which receives the output of the interface control circuit 182, for signals indicative of the occurrence of a touch-event or the absence thereof. In connection with step 705, the processor can also monitor additional parameters relating to the received inputs and record the information in the memory 630 or another storage medium for further processing. For instance, the processor can detect a transition of the input signal from voltage low to voltage high signifying a user touch of the user interface 150 and can also determine the duration of the touch event based on the measured duration of the voltage high signal seen at the input port 610.

At step 705, the configured processor 650 processes the detected inputs in accordance with prescribed rules and settings. More specifically, the processor 650 can be configured to determine the appropriate privacy state for the light filter 130 based on the detected user input and additional parameters including, for example, the current state of the light filter 130, measured parameters relating to the detected input and prescribed settings stored in the memory 630.

For instance, in a basic implementation in which the privacy device 100 has two operative states, opaque and transparent, the processor can be programmed to transition the device from its current state to the other state upon detecting any user touch. By way of further example, in implementations in which the privacy device 100 has five privacy states, say, opaque and 25%, 50%, 75% and 100% transparency, the processor can be configured to transition the device from its current state to an ensuing state in response to each discrete touch-event, thereby allowing the user to cycle through privacy states by successively interacting with the user interface 150. By way of further example, the processor can be configured to determine the appropriate privacy state based on the measured duration of a continuous user input and settings comprising threshold touch durations associated with respective privacy states. For instance, the processor can transition the device to the opaque state in response to a user touch that is shorter than a lower duration threshold (e.g., one second), transition the device to a semi-transparent state if the touch duration falls between the lower duration threshold and an upper duration threshold (e.g., 4 seconds), and transition the device to fully transparent state if the touch duration exceeds the upper duration threshold.

At step 710 the processor detects inputs that may be manual inputs from touch-sensitive surface 155, or other sensors (e.g., time of day). Based on these inputs and prescribed rules and settings, the processor determines the target privacy state.

At step 715, the microcontroller 186 generates and outputs one or more signals that cause the light filter 130 to transition to the appropriate privacy state determined at step 710. More specifically, as shown in FIG. 6, the microcontroller can include four output ports 605A-605D that are respectively connected to the film control circuit input nodes labeled 25%, 50%, 75% and "100% transparency" and numbered 405A-405D or 505A-505D in FIGS. 4 and 5, respectively. Depending on the determined privacy state and its corresponding transparency level, the processor 640 can output a signal via the appropriate output port among the output ports 605A-605D. Furthermore, in implementations in which the natural state of the PDLC smart film 132 is opaque, the absence of a control signal output by the processor 640 via an output port can result in the smart film remaining opaque.

As shown in FIG. 7, the processor 640 can be configured to continuously loop through one or more of steps 705-715 so as to detect and act on subsequent control inputs.

Although the exemplary embodiment of the privacy device 100 is primarily described as being controlled using a manual user interface 150, in addition or alternatively, the privacy device can be controlled by one or more other control input sources that are operatively connected to the control module 180.

FIG. 8 is a block diagram depicting an exemplary privacy device 800 that is operatively connected to a plurality of different control input sources in accordance with one or more embodiments of the invention. As shown, the privacy device 800 comprises a light filter 830 and a control module 880 that is operatively connected to control input sources including, for example and without limitation, a manual user interface 850 (e.g., a touch-sensitive surface), sensors 855, an IP camera 890 and computing devices such as a smartphone 892 and a remote computer 895. It should be understood that any one or more of the exemplary control input sources can be connected to the control module 880 depending on the implementation.

In particular, the control module comprises a processor 840 that serves to execute software instructions that can be loaded into the memory 830. The processor 840 can be implemented using multiple processors, a multi-processor core, or some other type of processor. The memory 830 is accessible by the processor, thereby enabling the processor to receive and execute instructions stored on the memory and/or on the storage 845. Memory 830 can be implemented using, for example, a random access memory (RAM) or any other suitable volatile or non-volatile computer readable storage medium. In addition, memory 830 can be fixed or removable.

The storage medium 845 can also take various forms, depending on the particular implementation. For example, storage medium can contain one or more components or devices such as a hard drive, a flash memory, a rewritable optical disk, a rewritable magnetic tape, or some combination of the above. The storage medium 845 also can be fixed or removable or remote such as cloud based data storage systems (remote memory or storage configuration not shown). The storage, for example, can be used to maintain a database, which stores information relating to user-defined settings or preferences that inform operation of the privacy device (e.g., the different privacy states/transparency levels, user-defined inputs, preferences and the like), information relating to installation of the privacy device (e.g., location), and/or data used or generated while carrying out operations using the privacy device 800.

As shown, the input devices can be operatively connected to the processor 840 via an I/O bus 835. In addition, the control module 880 can include a communication interface 882 that is operatively connected to the processor 840. The communication interface 882 can be any interface that enables communication between the processor 840 and external devices, machines and/or elements such as user input devices, sensors, remote computing devices via wired or wireless connections. For example, the communication interface can include, but is not limited to, a modem, a Network Interface Card (NIC), an integrated network interface, a radio frequency transmitter/receiver (e.g., Bluetooth, cellular, NFC, Wi-Fi), a satellite communication transmitter/receiver, an infrared port, a USB connection, and/or any other such interfaces for connecting the control module to other computing devices and/or communication networks 897, such as private networks and the Internet. Such connections can include a wired connection or a wireless connection (e.g., using the IEEE 802.11 standard) though it should be understood that communication interface can be practically any interface that enables communication to/from the processor. For example, the remote computer 895 is shown as being in indirect communication with the control module through a communications network 897 and the user smartphone 892 is in wireless communication with an antenna of the communication interface 882.

It should be understood that any number of input devices can be operatively connected to the control module 880 depending on the particular application of the privacy device 800. For example, as previously discussed, the control module 880 can be configured to receive manual user inputs that serve to transition the light filter 830 between privacy states via an on-board touch-sensitive user interface 850.

In addition or alternatively, the control module 880 can be configured to receive control inputs directly from the IP camera 890 that indicate an operative status of the IP Camera. For example, the control input can indicate whether the IP camera is recording and the control module 880 can be configured to transition the light filter 830 to a transparent state if the IP camera is recording and, otherwise, maintain an opaque state. In such a configuration, the privacy state can be controlled without user input and the visibly opaque or transparent light filter can also provide the user with visual feedback as to whether the IP camera is recording or not.

In addition or alternatively, the control module 880 can be configured to operate based on control inputs received from computing devices such as the remote computer 895 or the user smartphone 892. In a basic variation, the control inputs can include commands specifying the desired privacy state that prompt the control module to transition the light filter 830 to the appropriate privacy state. In more sophisticated variations, operation of the privacy device can be enhanced according to customized user-defined settings or preferences received from a computing device. Accordingly, the control module 880 can be configured to store the user-defined settings in memory 830 or storage 845 and control the light filter 830 according to these user-defined settings. For example, the settings can define a number of privacy states, respective transparency levels, customized user inputs associated with respective levels (e.g., prescribed touch durations, certain user commands that automatically determine a state), priority levels associated with respective input sources and the like.

By way of further example, the prescribed settings can also define prescribed conditions or events that can also control the operation of the privacy device 800. For instance, the control module 880 can be programmed to automatically adjust the transparency of the light filter 830 based on conditions such as the time of day, how long the light filter has been in a particular privacy state, the location of the privacy device, ambient lighting levels and the like. In some implementations, the control module 880 can be configured to monitor such conditions independently and in real time using sensors 855 and the like, which can be local to the control module or connected thereto. It can thus be appreciated that the control module can be programmed to implement various enhanced features and functionality by integrating sophisticated control input sources.

As a practical example, installation of the privacy device 800 with an IP Camera 890 in an elderly person's home can be programmed to maintain a high privacy level (e.g., an opaque state) as a default and transition to a lower privacy level (e.g., a transparent state) in response to the detection of certain events, say, if the person falls in their home and requires medical assistance. For example, the control module 880 can be configured to transition the light filter 830 to the transparent state in response to detecting a verbal call for help using an associated microphone or wirelessly receiving an emergency signal emitted by a medical alert device. By way of further example, a control input instructing the control module to remove the privacy protection can be received from an authorized remote computing device (e.g., computing device 897 or smartphone 892) operated by, say, a family member responding to an emergency alert or notification.

As noted, the privacy state of the exemplary privacy device 800 can be controlled through a first control path (e.g., the manual user input device 850 and associated hardware/software controls) that is completely separate from other control paths (e.g., a control path integrated with the IP camera). The components used to provide a separate control path can vary from separate applications executing on computing devices (such as smartphones, tablets, laptops, desktops) and backend services (by providers independent from the camera's providers), to separate physical mediums such as but not limited to, mechanical switches, infrared controls, ultrasound controls or wired controls. Voice control and gesturing are two additional means of control but the invention is not limited to these technologies. One intent in providing separate control paths is to remove the need to trust a single manufacturer or provider.

In accordance with a salient aspect of one or more of the disclosed embodiments, the manual user-interface 850 provided on-board the privacy device 800 and the control module 880 can be configured to define a first control path for controlling the privacy device that is independent and functionally isolated from other, potentially hackable, control paths. This separation can be achieved by, for example, physically isolating components of the user interface 850 and control module 880 that define the first control path from other potentially hackable control paths. Separation could also be achieved through immutably programming the control module to ignore, override or effectively block control inputs received from other control paths when operating on a control input received via the first control path. As a result, the isolated and prioritized control path (e.g., the manual user-controlled operation of the privacy device) is protected from hacking or being overridden by a remote computer that gains access to the IP camera, the privacy device itself, or any computing devices in data communication with the privacy device. In addition, the control module 880 can also be configured such that inputs received via the first control path override any inputs previously received or subsequently received via other control paths.

Moreover, as previously noted, in some implementations, the manual user-interface can comprise a mechanical or electro-mechanical switch that forces the smart film into a particular state and is unconditional and impossible to override by non-manual input means. By way of example and without limitation, the override switch can comprise a mechanical switch that disconnects the PDLC film from the power source, making it unconditionally opaque. However, alternative manual override switch configurations can be implemented to disable/interrupt or override other non-manual controls. The alternative manual override switch can also be configured to force the device to a particular state or the last manually-selected state, whether transparent, opaque or otherwise, and maintain the state.

It should be understood that, in accordance with one or more of the disclosed embodiments, the computing devices such as smartphone 892 and remote computer 895, can execute instructions in the form of one or more software modules that configure the devices to communicate and interface with the processor 840 of the control module 880, thereby preferably initiating, facilitating, maintaining, and/or enhancing the operation of the privacy device 800. In particular, the user-facing computing devices can be provided with a user application module that, when executed by the device's processor (not shown), configures the computing device to, for example and without limitation: guide a user to input user preferences and settings; store information that might be received from the control module 880 or other devices such as the IP Camera 890 (e.g., a video feed); process the received information; and store, monitor and output information relating to the operation of the privacy device and the IP Camera via an associated display or a web-based portal that is accessible to the user.

It should be further understood that while the various computing devices, control input sources, controllers and processors are referred to herein as individual/single devices and/or machines, in certain implementations the referenced devices and machines, and their associated and/or accompanying operations, features, and/or functionalities can be combined or arranged or otherwise employed across any number of such devices and/or machines, such as over a network connection, a wired or wireless communication connection, as is known to those of skill in the art.

At this juncture, it should be noted that although much of the foregoing description has been directed to systems and methods for selectively adjusting a transparency level of a privacy device used with an IP Camera, the systems and methods disclosed herein can be similarly deployed and/or implemented in scenarios, situations, and settings far beyond the referenced scenarios.

It should be appreciated that more or fewer operations can be performed than shown in the figures and described. These operations can also be performed in a different order than those described. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system and a computer implemented method, computer system, and computer program product for wirelessly configuring field devices. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the exemplary embodiments and applications illustrated and described, and without departing from the true spirit and scope of the present disclosure, which is set forth in the following claims.

The invention claimed is:

1. A privacy device for selectively controlling properties of light entering a lens of an image pickup device, comprising:
   a body having:
   a peripheral side-wall surrounding a generally hollow interior volume and defining an open back of the body,
   a mount adapted to attach the body to the device;
   a light filter supported by the body and defining a front side of the body opposite the open back, wherein the light filter comprises:
      a transparent substrate extending across the interior volume, and
      a smart film disposed on a surface of the substrate, wherein a transparency level of the smart film is adjustable as a function of an electrical control signal applied to the smart film.

2. The privacy device of claim 1 further including:
   a first user interface for detecting a user input and generating an electrical input signal based on the user input; and
   a control module electrically connected to the first user interface and the smart film, wherein the control module is configured to generate the control signal as a function of the input signal and thereby selectively controls the transparency of the smart film based on the user input.

3. The privacy device of claim 2, wherein the control module is configured to transition the smart film between a plurality of transparency levels selected from the group consisting of: a transparent level, an opaque level, and one or more semi-transparent levels.

4. The privacy device of claim 2, wherein the light filter further comprises:
   two conductive elements electrically connected to the control module and configured to apply the control signal across at least a portion of the smart film; and
   wherein the smart film is a Polymer Dispersed Liquid Crystal (PDLC) film, and wherein the transparency level of the smart film is a function of a voltage level of the control signal.

5. The privacy device of claim 4, wherein the control module comprises:
   a control input circuit electrically connected to the first user interface and a microcontroller, wherein the control input circuit is configured to detect the user interaction with the first user interface and generate the input signal;
   a microcontroller electrically connected to the control input circuit, wherein the microcontroller is configured to determine a target transparency level among the plurality of transparency levels based on the input signal received from the control input circuit; and
   a film control circuit electrically connected to the microcontroller, wherein the film control circuit is configured to generate the control signal based on the determined target transparency level, wherein the generated control signal has a voltage level that causes the smart film to transition to the target transparency level when applied across the smart film using the two conductive elements.

6. The privacy device of claim 2, wherein the first user interface comprises a touch-sensitive surface provided on an exterior surface of the peripheral sidewall and electrically connected to the control module.

7. The privacy device of claim 1, wherein the mount comprises an adhesive cuff for attaching the body to the camera such that the light filter occupies a field of view of the image pickup device.

8. The privacy device of claim 5, further comprising:
   a second control interface, wherein the microcontroller is configured to receive second input signal from the second control interface and control the transparency level of the smart film as a function of the second input signal, and wherein the second control interface is selected from the group consisting of: a user computing device, the IP camera, a user input device and a sensor.

9. The privacy device of claim 8, wherein the control module is configured to override any second input signals received from the second control interface in response to the input signal received from the first user interface.

10. The privacy device of claim 8, wherein a first control path defined by the control module and the first user interface is isolated from a second control path defined by the control module and the second control interface.

11. The privacy device of claim 1, wherein the image pickup device is an IP camera.

12. The privacy device of claim 2, wherein the first user interface is configured to manually override other inputs for controlling the transparency level of the smart film and force the smart film to a particular transparency level.

13. A method for selectively adjusting a privacy level during use of an image pickup device with a light-filtering privacy device, comprising the steps of:
providing a privacy device comprising (a) a body having a peripheral side-wall surrounding a generally hollow interior volume and defining an open back of the body, and a mount adapted to attach the body to the IP camera; (b) a light filter supported by the body and defining a front side of the body opposite the open back-side of the body, wherein the light filter includes comprises:
a transparent substrate extending across the interior volume, and
a smart film disposed on a surface of the substrate, wherein a transparency level of the smart film is adjustable as a function of an electrical control signal applied to the smart film,
a first user interface for detecting a user input and generating an electrical input signal based on the user input, and a control module electrically connected to the first user interface and the smart film, wherein the control module is configured to generate the control signal as a function of the input signal and thereby selectively controls the transparency of the smart film based on the user input;
detecting, with the first user interface, a user input and generating an electrical input signal;
determining, with the control module, a target transparency level among a plurality of transparency levels based on the input signal; and
generating, with the control module based on the target transparency level, a control signal that corresponds to the target transparency level; and
transitioning, by the control module, the light filter to the target transparency level by applying the control signal to the light filter.

14. The method of claim 13, wherein the plurality of transparency levels are selected from the group consisting of: a transparent level, an opaque level, and one or more semi-transparent levels.

15. The method of claim 13, wherein the control module comprises a microcontroller and a film control circuit that is configured to output the control signal at any one of a plurality of different voltage levels, wherein each voltage level corresponds to a respective transparency level among the plurality of transparency levels, and wherein the step of generating the control signal comprises:
causing, with the microcontroller, the film control circuit to output the control signal at a given voltage level that corresponds to the target transparency level.

16. The method of claim 13, further comprising:
providing a second control interface in communication with the control module, wherein the second control interface is selected from the group consisting of: a user computing device, the IP camera, a user input device, a sensor;
receiving, by the control module from the second control interface, a second input signal; and
performing, by the control module based on the second input signal, the steps of determining the target transparency level, generating the control signal and transitioning the light filter to the target transparency level based on the second input signal.

17. The method of claim 16, wherein the second input signal comprises one or more of an instruction to transition the light filter to another transparency level, and prescribed settings defining the plurality of transparency settings, and further comprising:
storing any prescribed settings in a non-transitory memory of the control module, and wherein the steps of determining the target transparency level, generating the control signal and transitioning the light filter to the target transparency level are performed by the control module as a function of any prescribed settings stored in the memory.

18. The method of claim 16, further comprising:
overriding any second input signal previously received from the second control interface in response to receipt of the control input signal from the first user interface and thereby determining the target transparency level, generating the control signal and transitioning the light filter to the target transparency level in response to the input signal received from the first user interface and without regard to any previously received second input signal.

19. A privacy device for selectively controlling properties of light entering a lens of an IP camera, comprising:
a body having:
a peripheral side-wall surrounding a generally hollow interior volume and defining an open back-side of the body,
a mount adapted to attach the body to the IP camera;
a light filter supported by the body and defining a front side of the body opposite the open back-side of the body, the light filter having:
a Polymer Dispersed Liquid Crystal (PDLC) smart film, wherein a transparency level of the smart film is adjustable between an plurality of transparency levels as a function of an electrical control signal, and
two conductive elements electrically connected to a control module and configured to apply the control signal across at least a portion of the smart film;
a first user interface having:
a touch-sensitive surface provided on an exterior surface of the peripheral sidewall,
a control input circuit electrically connected to the touch-sensitive surface and configured to detect a user touch of the touch-sensitive surface and generate an input signal as a function of the user touch; and
a control module electrically connected to the first user interface and the smart film, wherein the control module is configured to generate the control signal as a function of the input signal and thereby selectively controls the transparency of the smart film based on the user input, and wherein the control module includes:
a microcontroller electrically connected to the control input circuit, wherein the microcontroller is configured to determine a target transparency level among the plurality of transparency levels based on the input signal received from the control input circuit; and
a film control circuit electrically connected to the microcontroller, wherein the film control circuit is configured to generate the control signal based on the determined target transparency level, wherein the generated control signal has a voltage level that causes the smart film to transition to the target transparency level when applied across the smart film using the two conductive elements.

20. The privacy device of claim 19, wherein the transparency level of the smart film is a function of the voltage level of the control signal, and wherein the control module is configured to transition the smart film between a plurality of transparency levels selected from the group consisting of: a transparent level, an opaque level, and one or more semi-transparent levels.

21. The privacy device of claim 19, further comprising:
a second control interface, wherein the second control interface is selected from the group consisting of: a user computing device, the IP camera, a user input device, and a sensor, and
wherein the microcontroller is configured to receive the second input signal from the second control interface and control the transparency level of the smart film as a function of the second input signal.

22. The privacy device of claim 21, wherein the control module is configured to override any second input signals received from the second control interface in response to the input signal received from the first user interface.

23. The privacy device of claim 22, wherein a first control path defined by the control module and the first user interface is isolated from a second control path defined by the control module and the second control interface.

* * * * *